United States Patent
Gussin et al.

(10) Patent No.: US 12,197,296 B1
(45) Date of Patent: Jan. 14, 2025

(54) OPTIMIZING THE BACKUP AND RESTORATION OF FILES WITHIN A SERVICE

(71) Applicant: MICROSOFT TECHNOLOGY LICENSING, LLC, Redmond, WA (US)

(72) Inventors: Bradley Joseph Gussin, Seattle, WA (US); David Charles Oliver, Seattle, WA (US); Venkatesh Ashok Phadnavis, Redmond, WA (US); Dustin Alan Lee, Hillsboro, ND (US); Trent Green, Redmond, WA (US); Yahui Sun, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/477,281

(22) Filed: Sep. 28, 2023

(51) Int. Cl.
  *G06F 11/14* (2006.01)
  *G06F 16/11* (2019.01)
  *G06F 16/18* (2019.01)

(52) U.S. Cl.
  CPC ........ *G06F 11/1469* (2013.01); *G06F 16/125* (2019.01); *G06F 16/1873* (2019.01); *G06F 2201/80* (2013.01)

(58) Field of Classification Search
  CPC .............. G06F 11/1469; G06F 16/125; G06F 16/1873; G06F 2201/80
  USPC ....................................................... 707/654
  See application file for complete search history.

(56) References Cited

U.S. PATENT DOCUMENTS

| | | | | |
|---|---|---|---|---|
| 7,743,023 | B2* | 6/2010 | Teodosiu | G06F 16/184 707/614 |
| 9,921,918 | B1* | 3/2018 | Yellapragada | G06F 16/113 |
| 10,705,750 | B2* | 7/2020 | Sabourin | G06F 16/214 |
| 11,144,469 | B2* | 10/2021 | Geri | G06F 12/1081 |
| 11,704,043 | B1* | 7/2023 | Throgmorton | G06F 11/1469 711/162 |
| 2016/0292043 | A1* | 10/2016 | Dennis | G06F 11/1451 |

(Continued)

OTHER PUBLICATIONS

Teper, Jeff, "Welcome to Microsoft Inspire 2023: Introducing Microsoft 365 Backup and Microsoft 365 Archive", Retrieved from: https://techcommunity.microsoft.com/t5/microsoft-syntex-blog/welcome-to-microsoft-inspire-2023-introducing-microsoft-365/ba-p/3874887, Jul. 18, 2023, 17 Pages.

*Primary Examiner* — Robert Stevens
(74) *Attorney, Agent, or Firm* — Newport IP, LLC; Jacob P. Rohwer (57) ABSTRACT

The system described herein provides the ability to efficiently back up and restore files within a service, such as a network-based file hosting service or a collaboration service. The system is configured to improve file restoration (may also be referred to as recovery) that occurs in response to an event (may also be referred to as an incident) that compromises a tenant device on which the files reside, thereby preventing access to the files or corrupting the files that are available to the tenant. An example of an event includes a ransomware attack. The described system utilizes a set of defined resources within a boundary to back up tenant files and restore the files. The resources include a metadata database and a blob store. The system combines mutable metadata with immutable content objects within the service to provide faster restoration than the conventional approach.

20 Claims, 5 Drawing Sheets

(56) References Cited

U.S. PATENT DOCUMENTS

| | | | |
|---|---|---|---|
| 2018/0373604 A1* | 12/2018 | Martin | G06F 11/1451 |
| 2019/0391879 A1* | 12/2019 | Jarvie | G06F 16/284 |
| 2021/0064483 A1* | 3/2021 | Paramasivam Balakrishnan | |
| | | | G06F 11/1471 |
| 2021/0318935 A1* | 10/2021 | Jacobs | G06F 11/1469 |
| 2023/0185774 A1* | 6/2023 | Brand | G06F 16/134 |
| | | | 707/827 |

* cited by examiner

OPTIMIZING THE BACKUP AND RESTORATION OF FILES WITHIN A SERVICE

BACKGROUND

Services such as network-based file hosting services (e.g., GOOGLE DRIVE, ICLOUD DRIVE, AMAZON DRIVE, MICROSOFT ONEDRIVE) and file collaboration services (e.g., GOOGLE WORKSPACE, BOX, MICROSOFT SHAREPOINT) have become critical aspects of working with computing systems. Tenants, alternatively referred to as clients (e.g., an individual user, an organization, a company), rely on these services to store and interact with files (e.g., documents, emails, spreadsheets, slide decks, executable files, images, videos).

There are several circumstances where the service and/or the tenant need to restore a file to a previous version. For example, an event that occurs on the client-side such as a ransomware attack can compromise a tenant device on which the file resides, thereby preventing access to the file or corrupting the file that is available to the tenant. If such an event occurs, the tenant typically needs to restore the file to a previous version of the file that existed before the compromise.

To enable the file to be restored, a tenant conventionally contracts with a third-party backup service to export versions of the file over a period of time, so the versions of the file are backed up and stored outside the service. Over time, these exported versions become the aforementioned previous versions of the file. In a scenario in which the file needs to be restored, the tenants of the service rely on the third-party backup service to import the desired version of the file back into the service, so the state of the file is returned to a non-compromised state.

Utilizing a third-party backup service, as described above, increases the amount of time needed to restore a group of files for a tenant as the files must be communicated from the third-party backup service to the service. This increased amount of time often hinders a tenant's productivity and/or affects the tenant's operations, thereby reducing the tenant satisfaction with the service.

Furthermore, utilizing a third-party backup service requires the tenant to configure additional file access control and protection mechanisms associated with the communications (e.g., the exportation and the importation) of the file for backup and restoration purposes. This additional file access control and protection mechanisms increase the management overhead of files for the tenants, as well as expands the exposure of the files to security risks. For example, unauthorized access to the files is more likely because the files are communicated to the third-party backup service via public network(s).

It is with respect to these and other technical challenges that the disclosure made herein is presented.

SUMMARY

The system described herein provides the ability to efficiently back up and restore files within a service, such as a network-based file hosting service or a collaboration service. The system is configured to improve file restoration (may also be referred to as recovery) that occurs in response to an event (may also be referred to as an incident) that compromises a tenant device on which the files reside, thereby preventing access to the files or corrupting the files that are available to the tenant. An example of an event includes a ransomware attack. As described above, the files may include documents, emails, spreadsheets, slide decks, executable files, images, videos.

The described system backs up tenant files and restores the files, as needed, within a boundary of the service. The boundary of the service is created based on a defined set of resources (e.g., processing resources, storage resources, network resources) that are dedicated to the service. Therefore, the backup exposure to the files is limited to an operator of the service that contains the set of defined resources and an owner of the files. Stated alternatively, the boundary of the service separates the defined set of resources from (i) other resources that are operated by a different operator or (ii) or other resources that are dedicated to a different service (e.g., with different tenants). Therefore, as part of the backup process, the files never leave the boundary of the service.

As described herein, by backing up and restoring files internally within the service, a tenant is no longer required to contract with a third-party backup service to export versions of the file over a period of time. The conventional system stores the files externally, outside of the service boundary. Storing the files externally requires the system to export versions of the file outside the service, to a third-party backup service. Over time, these exported versions become the aforementioned previous versions of the file. Conventionally, in a scenario in which the file needs to be restored, the tenant of the service relies on the third-party backup service to import the desired version of the file back into the service, so the state of the file is returned to a non-compromised state.

Utilizing a third-party backup service, as described above, increases the amount of time needed to restore a group of files for a tenant as the files must be communicated from the third-party backup service to the service. This increased amount of time often hinders a tenant's productivity and/or affects the tenant's operations, thereby reducing the tenant satisfaction with the service. For instance, restoring a site that stores twenty-five terabytes of file data takes about a week using a conventional third-party backup service while the disclosed system that restores the site within the service boundary is able to fully restore the site within a few hours.

Furthermore, by backing up and restoring files internally within the service, the tenant of the service is no longer required to configure additional file access control and protection mechanisms associated with the communications (e.g., the exportation and the importation) of the file for backup and restoration purposes using a third-party backup service. Consequently, the management overhead is reduced for the tenant and the need to manage access in multiple domains is eliminated. For example, when files are transmitted over public networks to a new location, access control to the files must be managed independently in the new location and must be secured or encrypted during transit to maintain the original security and access control posture.

To efficiently implement the backup and restoration of files within the service boundary, the system described herein configures and uses a metadata database and a binary large object (blob) store. The metadata database (e.g., an SQL database) is configured to store file metadata (e.g., access control lists (ACLs), owner of file, size of file, title of the file) in a mutable manner. Mutable means that the file metadata is subject to change or capable of being updated. Accordingly, only one version of the file metadata is stored in the metadata database throughout the backup process for a file.

The blob store is configured to store file content as a group of content objects in an immutable manner. Accordingly, the content objects are referred to herein as immutable content objects. A content object is a discrete and self-contained unit of content within a larger context, such as a file (e.g., the file is divided into smaller content objects). In one example, the content objects are referred to as blobs. Immutable means previous versions of the file content are never updated or changed as new versions of the file content are backed-up and stored. Rather, a new version of the file content is stored as a new set of immutable content objects, and thus, different versions of the same file are stored within the system over a period of time, though the different versions of the same file may contain different file content.

The system separates the storage of the file metadata and the file content to improve the efficiency with regard to backing up and restoring files. The blob store is a basic component that supports a limited number of operations. For instance, the blob store may only support write, read, and delete operations related to a set of immutable content objects. Consequently, the blob store is not configured to support a large number of query operations. Rather, the limited number of operations supported of the blob store allows for faster storage and retrieval of files and cost efficiency.

In contrast to the blob store, the metadata database is configured to support more complex operations including various query operations Consequently, the metadata database is more expensive to configure and operate. However, the file metadata amounts to an insignificant percentage of the total storage since the file content outweighs the metadata. Therefore, the backup and restore operations that copy and recall the state of the metadata at a particular point in time, as described below, is extremely efficient.

The system further includes a control plane application programming interface (API) usable by the service and/or the tenants to access the metadata database and the blob store. The control plane API orchestrates the process for backing up and storing files. For example, the control plane API is usable to back up the files at various times in accordance with a predefined schedule. In this example, the system may set the predefined schedule to every hour, every six hours, every day, or every week. In another example, the control plane API is usable to back up the files when modifications to the files occur. The control plane API further orchestrates the process for retrieving information and restoring the files based on a restore time specified in a restoration request.

As described herein, the system captures current metadata of a current version of a file accessible to the tenant via a tenant device. Moreover, the system captures current content of the current version of the file accessible to the tenant via the tenant device. The system updates, in the metadata database, the version of the metadata for the file based on the current metadata in the current version of the file. The system stores, in the blob store, the current content of the current version of the file as a new version of immutable content objects. Due to the immutability of the blob store, the new version of immutable content objects is stored in addition to previous versions of immutable content objects stored for previous versions of the file.

After the current metadata of the file and the current content of the file, as made available via a tenant device, are backed up multiple times over a period of time based on a schedule or based on modifications, there may be an event (e.g., a ransomware attack) that compromises the tenant device thereby corrupting of the file or prevent access to the file. After the event occurs, the tenant initiates a restoration request and provides the restoration request to the system. The tenant provides input that defines a restore time that occurs before the event, and the restore time is specified in the restoration request. Based on the restoration request, the system via the control plane API retrieves, within the boundary and via the metadata database, the version of the metadata for the file and references to a previous version of immutable content objects stored for a previous version of the file associated with the restore time specified in the restoration request.

In one example, a ransomware attack occurs at 2:30 P.M. If the system backs up a file at 8:00 A.M. and 3:00 P.M. there is a possibility that the backup at 3:00 P.M. is compromised (e.g., the system continues to back up new versions of the file after the ransomware attack). In order to restore the file to a non-compromised version, the immutable content objects from the 8:00 A.M backup are retrieved in response to the restoration request (e.g., assuming the 8:00 A.M. backup time is the closest time before the ransomware attack occurs at 2:30 P.M.). The immutable content objects from the 8:00 A.M backup are identified over the immutable content objects from the 3:00 P.M backup even though the 3:00 P.M. backup is closer in time to the occurrence of the ransomware attack at 2:30 P.M.

The predefined schedule can be established for a group of files within a container. Accordingly, the version of the metadata stored in the metadata database for the file can include timestamps that correspond to the scheduled times at which the file content is captured and backed-up in the blob store. Stated alternatively, the version of metadata for the file stored in the metadata database includes information that indicates a backup schedule and that maps to different sets of immutable content objects stored for different versions of the file. In various examples, the system takes snapshots of the file metadata in accordance with the predefined schedule and, in addition to updating the metadata in the metadata database with timestamps of recently added versions of immutable content objects, the system stores the metadata snapshots in the blob store so a full fidelity previous version of file metadata can be restored to match with a corresponding previous version of file content.

The predefined schedule for backing up the file can be implemented as part of a service policy that backs up a group of related files within a container (e.g., a specific site where files are stored for collaboration, a specific location that stores files for an authorized user). Accordingly, all the files stored within the container are backed up at the same time and this is referred to as a container-level backup.

The described system is customizable to the needs of each tenant. For example, a retention period is associated with a tenant's backup and restoration policy. The retention period determines how long a backed-up version of a file exists within the system. In one example, the retention period for the files is negotiated with a tenant and defined in a tenant agreement (e.g., a service level agreement (SLA)). In another example, the service determines the retention period (e.g., one year) for files as part of a general policy applicable to multiple different tenants. Upon reaching the end of the retention period, the backed-up content for the file is deleted from the blob store and the file metadata is updated to reflect the deletion (e.g., the timestamp associated with the deleted immutable objects is removed from the metadata). The tenant can customize the tenant's backup and restoration policy (e.g., the retention period) based on the needs of the industry within which the tenant operates.

Implementing the techniques described herein enable point in time restores (e.g., for files contained in a site, a storage box, an account) to occur with massive scale and at unparalleled speeds that are unachievable by the conventional techniques that use a third-party restoration service configured outside the service boundary. The techniques described herein also enable seamless integration with security and compliance features due to the fact that files no longer need to be imported and exported outside the service boundary.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

The system described herein provides the ability to efficiently back up and restore files within a service, such as a network-based file hosting service or a collaboration service. The system is configured to improve file restoration (may also be referred to as recovery) that occurs in response to an event (may also be referred to as an incident) that compromises a tenant device on which the files reside, thereby preventing access to the files or corrupting the files that are available to the tenant. An example of an event includes a ransomware attack. As described above, the files may include documents, emails, spreadsheets, slide decks, executable files, images, videos.

Figure 1:
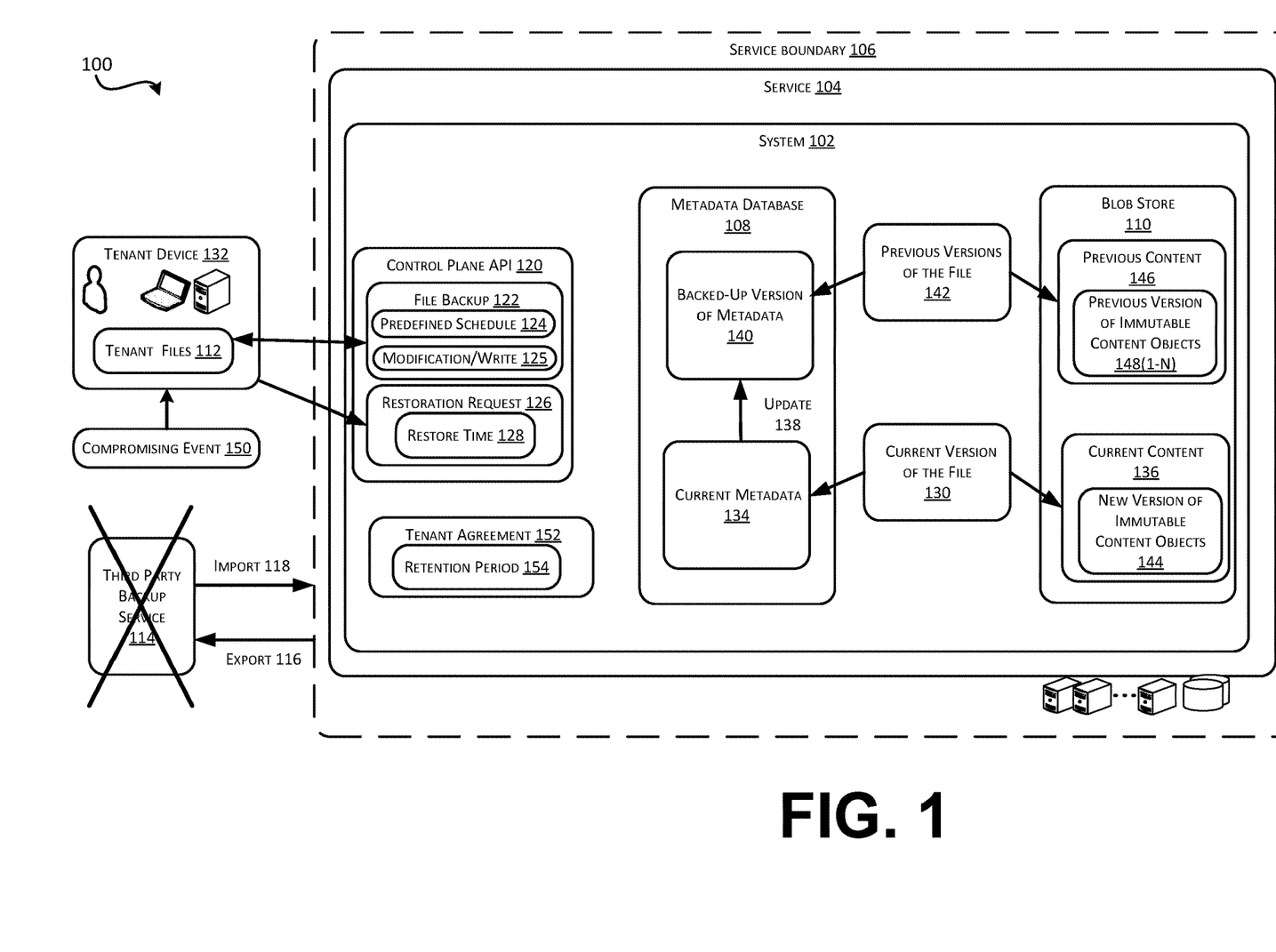
FIG. 1 illustrates an example environment in which a system stores mutable file metadata in a metadata database and stores immutable file content in a blob store. The described system backs up tenant files and restores the tenant files, as needed, within a boundary of the service.

FIG. 1 illustrates an example environment 100 in which a system 102 that composes part of a service 104 is able to back up and restore files within a service boundary 106. More specifically, the system 102 stores mutable file metadata within a metadata database 108 and immutable file content within a blob store 110.

The described system 102 backs up tenant files 112 and restores the tenant files 112, as needed, within a boundary of the service 106. The boundary of the service 106 is created based on a defined set of resources (e.g., processing resources, storage resources, network resources) that are dedicated to the service 104. Therefore, the backup exposure to the tenant files 112 is limited to an operator of the service 104 that contains the set of defined resources and an owner of the tenant files 112 (e.g., the tenant users). Stated alternatively, the boundary of the service 106 separates the defined set of resources from (i) other resources that are operated by a different operator or (ii) or other resources that are dedicated to a different service (e.g., with different tenants). Therefore, as part of the backup process, the tenant files 112 never leave the boundary of the service 106.

As described herein, by backing up and restoring the tenant files 112 internally within the service 104, a tenant is no longer required to contract with a third-party backup service 114 to export 116 different versions of a file over a period of time (as illustrated via the X through the third-party backup service 114). The conventional approach that uses the third-party backup service 114 stores the files externally, outside of the service boundary 106. Storing the files externally requires the system 102 to export 116 the different versions of the file, outside the service 104, to the third-party backup service 114. Conventionally, in a scenario in which the tenant files 112 needs to be restored, the tenant of the service 104 relies on the third-party backup service 114 to import 118 a desired version of the file back into the service 104, so the state of the file is returned to a non-compromised state.

Utilizing the third-party backup service 114, as described above, increases the amount of time needed to restore a group of files for a tenant as the files must be communicated from the third-party backup service 114 to the service 104. This increased amount of time often hinders a tenant's productivity and/or affects the tenant's operations, thereby reducing the tenant satisfaction with the service 104. The described system 102 eliminates the need for the third-party backup service 114, as illustrated.

Furthermore, by backing up and restoring files internally within the service 104, the tenant of the service 104 is no longer required to configure additional file access control and protection mechanisms associated with the communications (e.g., the exportation 116 and the importation 118) of the file for backup and restoration purposes using the third-party backup service 114. Consequently, the management overhead is reduced for the tenant and the need to manage access in multiple domains is eliminated. For example, when files are transmitted over public networks to a new location, access control to the files must be managed independently in the new location and must be secured or encrypted during transit to maintain the original security and access control posture.

To efficiently implement the backup and restoration of tenant files 112 within the service boundary 106, the system 102 described herein configures and uses a metadata database 108 and a binary large object (blob) store 110. The metadata database 108 (e.g., an SQL database) is configured to store file metadata (e.g., access control lists (ACLs), owner of file, size of file, title of the file) in a mutable manner. Mutable means that the file metadata is subject to change or the backed-up version of metadata 121 is capable of being updated. Accordingly, only one version of the file metadata is stored in the metadata database 108 throughout the backup process for the tenant files 112.

The blob store 110 is configured to store file content as a group of content objects in an immutable manner. Accordingly, a set of content objects are referred to herein as immutable content objects. An immutable content object is a discrete and self-contained unit of content within a larger context, such as a file (e.g., the file is divided into smaller content objects). In one example, the immutable content objects are referred to as blobs. Immutable means previous versions of the file content are never updated or changed as new versions of the file content are backed-up and stored. Rather, a new version of the file content is stored as a new set of immutable content objects, and thus, different versions of the same file are stored within the system 102 over a period of time, though the different versions of the same file may contain different file content.

The system 102 separates the storage of the file metadata and the file content to improve the efficiency with regard to backing up and restoring the tenant files 112. The blob store 110 is a basic component that supports a limited number of operations. For instance, the blob store 110 may only support write, read, and delete operations related to a set of immutable content objects. Consequently, the blob store 110 is not configured to support a large number of query operations. Rather, the limited number of operations supported of the blob store 110 allows for faster storage and retrieval of files and cost efficiency.

In contrast to the blob store 110, the metadata database 108 is configured to support more complex operations including various query operations Consequently, the metadata database 108 is more expensive to configure and operate. However, the file metadata amounts to an insignificant percentage of the total storage since the file content outweighs the metadata. Therefore, the backup and restore operations that copy and recall the state of the metadata at a particular point in time is extremely efficient.

The system 102 further includes a control plane application programming interface (API) 120 usable by the service 104 and/or the tenants to access the metadata database 108 and the blob store 110. The control plane API 120 orchestrates the process for a file backup 122 (e.g., storing a tenant file 112 in the metadata database 108 and the blob store 110). In one example, the control plane API 120 is usable to back up the tenant files 112 at various times in accordance with a predefined schedule 124. In this example, the system 102 may set the predefined schedule 124 to every hour, every six hours, every day, every week, and so forth. In another example, the control plane API 120 is usable to back up the files when modifications 125 to the files occur. The control plane API 120 further orchestrates the process for retrieving information and restoring the tenant files 112 via the reception of a restoration request 126 that specifies a restore time 128.

As part of the file backup process 122, the system 102 captures a current version of a file 130 (e.g., a tenant file 112) accessible to the tenant via a tenant device 132. The current version of the file 130 includes current metadata 134 and current content 136. As shown in FIG. 1, the system 102 updates 138 the mutable version of the metadata 140 for the file that has already been backed-up and stored in the metadata database 108 based on previous versions of the file 142. Furthermore, the system 102 stores the current content 136 of the current version of the file 130 in the blob store 110 as a new version of immutable content objects 144. Due to the immutability of the blob store 110, the new version of immutable content objects 144 is stored in addition to previous content 146 associated with the previous versions of the file 142, stored as previous versions of immutable content objects 148(1-N).

After the current metadata 134 of the file and the current content 136 of the file, as made available via the tenant device 132, are backed up multiple times over a period of time as defined in the predefined schedule 124, there may be an event 150 (e.g., a ransomware attack) that compromises the tenant device 132 thereby corrupting the tenant files 112 or preventing access to the tenant files 112.

After the event 150 occurs, the tenant initiates the restoration request 126 and provides the restoration request 126 to the control plane API 120 of the system 102. The tenant provides input that defines the restore time 128 that is known to occur before a time at which the event 150 starts, and the restore time 128 is specified in the restoration request 126. Based on the restoration request 126, the system 102 via the control plane API 124 retrieves, within the boundary 106 and via the metadata database 108, the backed-up version of the metadata 140 for the file. The backed-up version of the metadata 140 includes timing information and references to a previous version of immutable content objects (one of 148(1-N)), which are stored for a previous version of the file 142 associated with the restore time 130 such that the tenant file can be restored to a non-compromised state.

In one example, a ransomware attack occurs at 2:30 P.M. If the system 102 backs up a file at 8:00 A.M. and 3:00 P.M. there is a possibility that the backed-up version of the file at 3:00 P.M. is compromised as the system 102 continues to back up new versions of the file even after the ransomware attack. In order to restore the file to a non-compromised version, the immutable content objects 148 from the 8:00 A.M. backup are retrieved in response to the restoration request 132 (e.g., assuming the 8:00 A.M. backup time is the closest backup time before the ransomware attack occurs at 2:30 P.M.—as specified in the restore time 128). The immutable content objects from the 8:00 A.M. backup is identified over the immutable content objects from the 3:00 P.M backup even though the 3:00 P.M. backup is closer in time to the occurrence of the ransomware attack at 2:30 P.M.

In various examples, the predefined schedule 124 for backing up the tenant files 112 can be implemented as part of a service policy that backs up a group of related files within a container (e.g., a specific site where files are stored for collaboration, a specific location that stores files for an authorized user). Accordingly, all the tenant files 112 stored within the container are backed up at the same time and this is referred to as a container-level backup.

The described system 102 is customizable to the needs of each tenant. For example, an operator of the service 104 and the tenant can compose a tenant agreement 152 (e.g., a service level agreement (SLA)) that defines a retention period 154 associated with a tenant's backup and restoration policy. The retention period 154 determines how long a backed-up version of a file exists within the blob store 110. In one example, the retention period 154 for the tenant files 112 is flexible and can be negotiated with a tenant and defined in the tenant agreement 152. In another example, the retention period 154 (e.g., one year) for the tenant files 112 is applied to the tenant agreement 152 as part of a general policy applicable to multiple different tenants. Upon reaching the end of the retention period 154, an expired version of immutable objects is deleted from the blob store 110 and the file metadata 140 is updated to reflect the deletion (e.g., the timestamp associated with the deleted version of immutable objects is removed from the metadata). The tenant's backup and restoration policy (e.g., the retention period 146) can be customized based on the needs of the industry within which the tenant operates.

Implementing the techniques described herein enable point in time restores (e.g., for files contained in a site, a storage box, an account) to occur with massive scale and at unparalleled speeds that are unachievable by the conventional techniques that use the third-party restoration service 114 configured outside the service boundary 106. The techniques described herein also enable seamless integration with security and compliance features due to the fact that the tenant files 112 no longer need to be exported 116 and imported 118 with respect to the service boundary 106.

Figure 2:
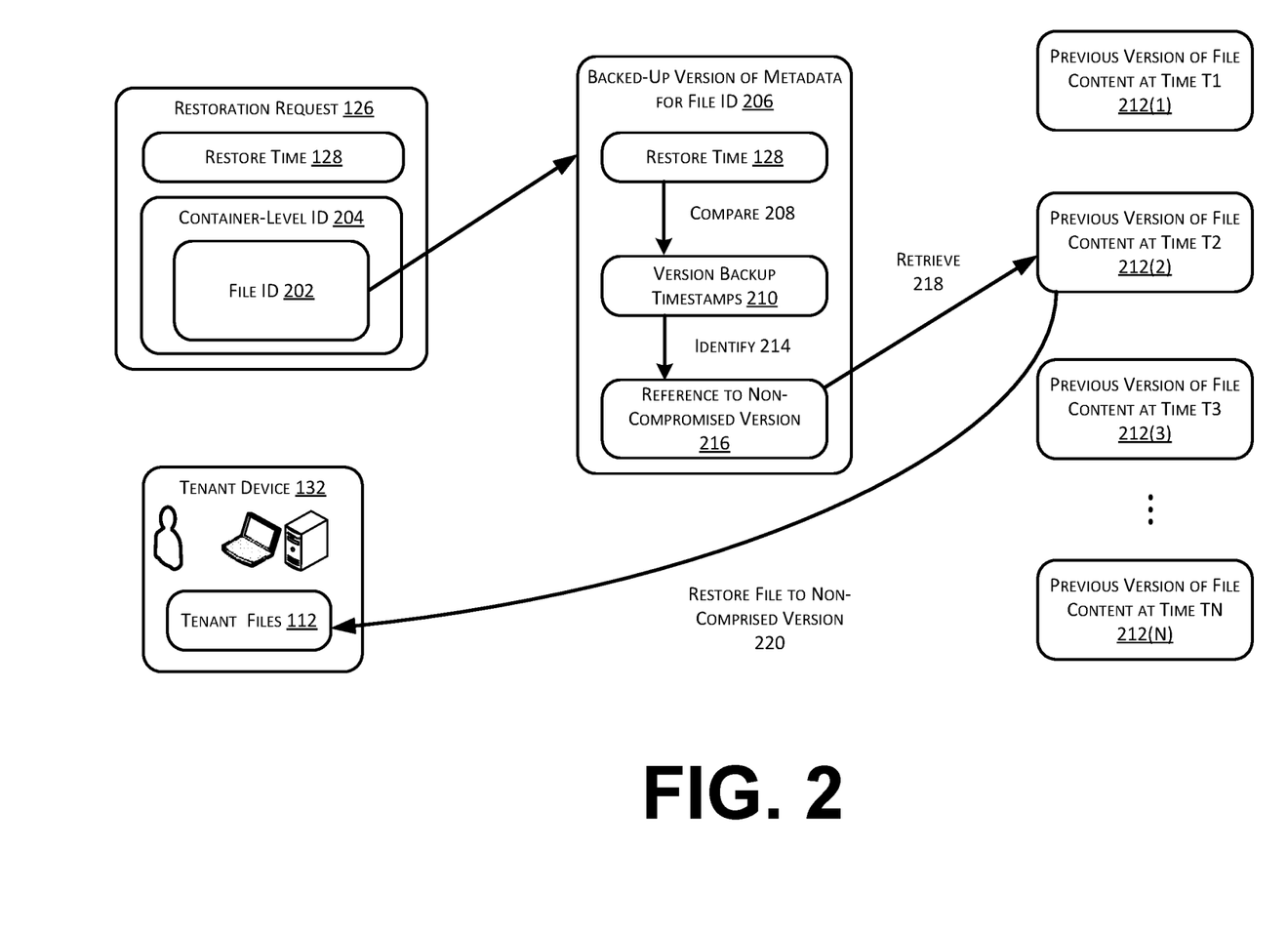
FIG. 2 illustrates a diagram in which the system restores a tenant file by mapping a restore time in a restoration request to an identifiable non-compromised version of the file.

FIG. 2 illustrates an example environment in which the system restores a tenant file by mapping a restore time 128 in the restoration request 126 to an identifiable non-compromised version of the file. As shown, in addition to the restore time the restoration request may include a file identification (ID) 202, which identifies a specific tenant file 112. In various examples, the file ID 202 may be included as part of a container-level ID 204. Examples of the containers identifiable via the container-level ID 204 include sites and storage accounts. The system 102 uses the file ID 202 to access a backed-up version of the metadata 206 for a particular tenant file 112, as stored in the metadata database 108.

The system uses the restore time 128 to identify and/or locate reference(s) to a non-compromised version of the tenant file associated with the file ID 202. For example, the system compares 208 the restore time 128 to a group of timestamps 210 associated with the backed-up versions of the file. The timestamps 210 correspond to the scheduled times at which the file content for file ID 202 is captured and backed-up in the blob store 110. Stated alternatively, the backed-up version of metadata 206 for file ID 202 includes information that indicates a backup schedule and that maps to different sets of immutable content objects 212(1-N) stored for different previous versions of the file.

Based on the comparison 208, the system 102 is able to select the timestamp that is closest to the restore time 128 and before the restore time 128 such that the corresponding version of the file is guaranteed to be a non-compromised version of the file (e.g., not corrupted due to an event 150). The selected timestamp is useable by the system 102 to identify 214 reference(s) to the non-compromised version of the file 216.

As described above, previous versions of file content may be backed up despite being compromised. For example, the previous version of file content at time T3 212(3) may have been backed up after the restore time 128 (e.g., after the compromising event 150 occurs), and thus, may be compromised. Regardless, the system 102 is still configured to store the version of file content at time T3 212(3) as a set of immutable content objects in the blob store 110. The reference to the non-compromised version of the file 216 retrieves 218 the previous version of file content at a time T2 216(2) that is closes to the restore time 128 and before the restore time 128. Consequently, the previous version of file content at time T2 212(2) is not compromised because T2 is a time before a time at which the compromising event 150 occurs. Accordingly, FIG. 2 illustrates that the previous version of file content at time T2 216(2) is retrieved 218 and used to restore the file to a non-compromised version 220 (e.g., provide the non-compromised version of the file to the tenant device 132).

In various examples, when restoring the files at the container-level (e.g., a collaboration site), the system 102 can flush the "bad" versions of the files so they no longer exist in the blob store 110 (e.g., the ones that have been affected by the ransomware). Consequently, the system 102 provides the benefit of a "roll back" to a prior point in time when the files are healthy.

Figure 3:
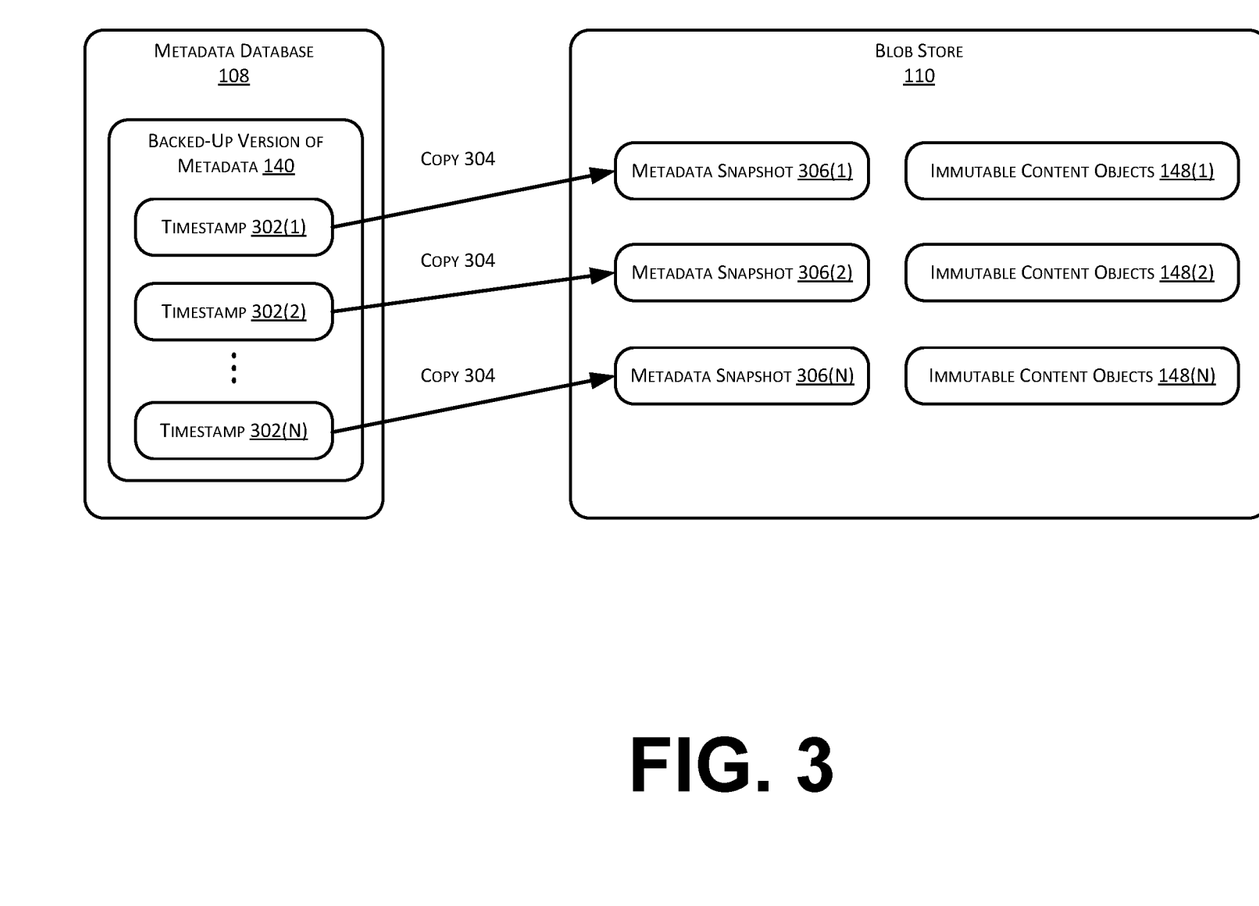
FIG. 3 illustrates a diagram in which the system copies snapshots of the file metadata to the blob store to enable restoration of a tenant file.

FIG. 3 illustrates a diagram in which the control plane API 120 copies snapshots of the file metadata to the blob store to enable restoration of a tenant file. As shown, the mutable and backed-up version of the metadata 140 in the metadata database 108 includes timestamps 302(1-N) associated with when different versions of the file content are stored in the blob store 110 (as captured in FIG. 1 via elements 142, 146, and 148(1-N)). To help with restoring the file to a full fidelity version, the control plane API 120 copies 304 the mutable and backed-up version of the metadata 140 at the different times associated with the timestamps 302(1-N) to the blob store 110 as metadata snapshots 306(1-N). As shown, the metadata snapshots 306(1-N) are associated with the different versions of immutable content objects 148(1-N) for the file. Accordingly, a corresponding metadata snapshot can be accessed and retrieved based on the timestamp selected, as described above in FIG. 2, and the corresponding metadata snapshot can be used to restore the previous version of the file associated with the restore time.

Figure 4:
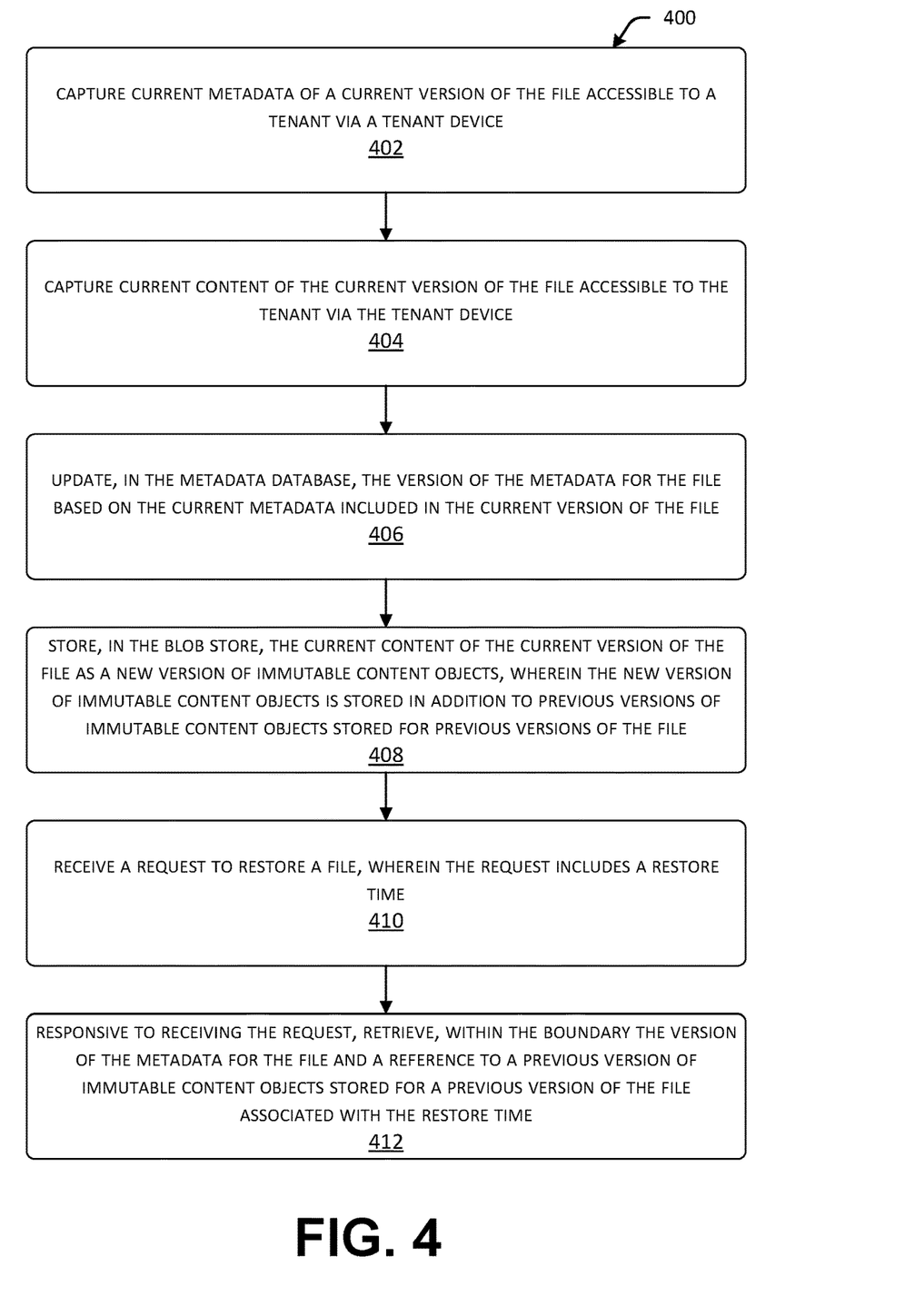
FIG. 4 is an example flow diagram showing aspects of a method implemented to back up and restore files of a tenant accessible via a service that contains a set of defined resources within a boundary such that backup exposure to the files is limited to an operator of the service that contains the set of defined resources and an owner of the data.

Turning now to FIG. 4 an example flow diagram 400 showing aspects of a method implemented to provide backing up and restoring files for a tenant of a service that contains a set of defined resources within a boundary such that backup exposure to the files is limited to an operator of the service that contains the set of defined resources and an owner of the data.

At operation 402, the system captures current metadata of the current version of the file accessible to the tenant via a tenant device.

At operation 404, the system captures current content of the current version of the file accessible to the tenant via the tenant device.

At operation 406, the system updates, in the metadata database, the version of the metadata for the file based on the current metadata in the current version of the file.

At operation 408, the system stores, in the blob store, the current content of the current version of the file as a new version of immutable content objects. The new version of immutable content objects is stored in addition to previous versions of immutable content objects stored for previous versions of the file. As described above, in one example operations 402, 404, 406, 408 can be iteratively performed in accordance with the predefined schedule 124. In another example, operations 402, 404, 406, 408 are performed when a file is modified or edited.

At operation 410, the system receives a request to restore the file, wherein the request includes a restore time.

Lastly, at operation 412, the system responds to receiving the request, retrieving, within the boundary, the version of the metadata for the file and a reference to a previous version of immutable content objects stored for a previous version of the file associated with the restore time.

For ease of understanding, the method discussed in this disclosure are delineated as separate operations represented as independent blocks. However, these separately delineated operations should not be construed as necessarily order dependent in their performance. The order in which the method is described is not intended to be construed as a limitation, and any number of the described blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 5:
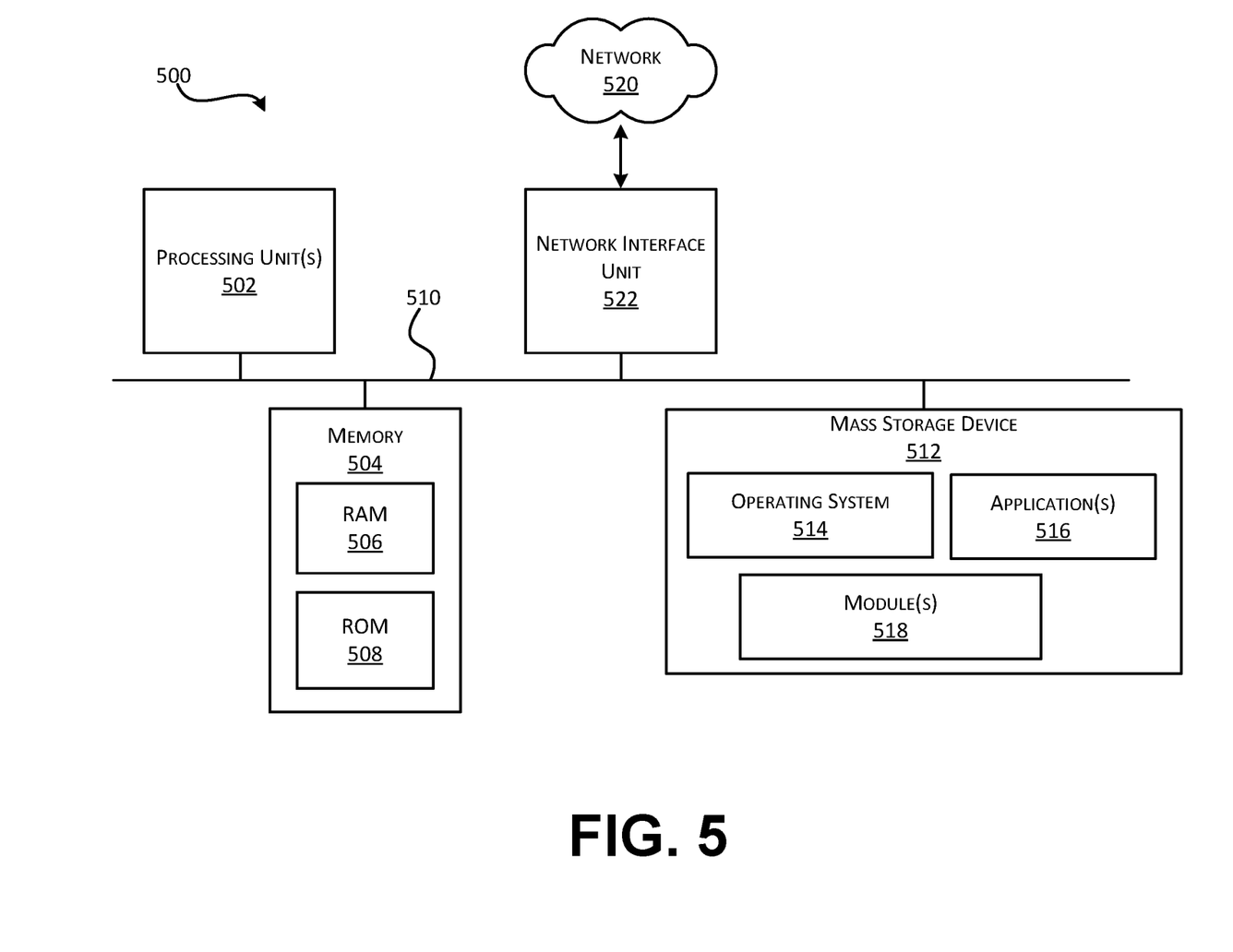
FIG. 5 illustrates a computer architecture diagram showing an illustrative computer hardware and software architecture for a computing system capable of implementing aspects of the techniques and technologies presented herein.

FIG. 5 shows additional details of an example computer architecture 500 for a device, such as a computer or a server capable of executing computer instructions. The computer architecture 500 illustrated in FIG. 5 includes processing unit(s) 502, a system memory 504, including a random-access memory 506 (RAM) and a read-only memory (ROM) 508, and a system bus 510 that couples the memory 504 to the processing unit(s) 502. The processing units 502 may also comprise or be part of a processing system. In various examples, the processing units 502 of the processing system are distributed. Stated another way, one processing unit 502 of the processing system may be located in a first location (e.g., a rack within a datacenter) while another processing unit 502 of the processing system is located in a second location separate from the first location.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

While certain example embodiments have been described, these embodiments have been presented by way of example only and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different versions).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system for backing up and restoring files for a tenant of a service that contains a set of defined resources within a boundary such that backup exposure to the files is limited to an operator of the service that contains the set of defined resources and an owner of the files, comprising:
one or more processors;
a metadata database configured, as part of the set of defined resources, to store a version of metadata for a file accessible via the service;
a binary large object (blob) store configured, as part of the set of defined resources, to store immutable content objects that comprise different versions of content of the file accessible via the service; and
computer storage media storing instructions that, when executed by the one or more processors, cause the system to perform operations comprising:
capturing current metadata for a current version of the file accessible to the tenant via a tenant device;
capturing current content of the current version of the file accessible to the tenant via the tenant device;
updating, in the metadata database, the version of the metadata for the file based on the current metadata for the current version of the file;
storing, in the blob store, the current content of the current version of the file as a new version of immutable content objects, wherein the new version of immutable content objects is stored in addition to previous versions of immutable content objects stored for previous versions of the file;
receiving a request to restore the file, wherein the request includes a restore time; and
responsive to receiving the request, retrieving, within the boundary, the version of the metadata for the file and a reference to a previous version of immutable content objects stored for a previous version of the file associated with the restore time.

2. The system of claim 1, wherein the metadata database is mutable such that the version of metadata for the file is capable of being updated with metadata modifications that occur over time.

3. The system of claim 1, wherein the blob store is immutable such that the previous versions of immutable content objects, stored for the previous versions of the file, cannot be updated and are retained for a retention period.

4. The system of claim 3, wherein the tenant determines the retention period for the file.

5. The system of claim 3, wherein the service determines the retention period for the file as part of a policy for multiple different tenants.

6. The system of claim 1, wherein a control plane application programming interface (API) implements the updating and the storing in accordance with a predefined schedule.

7. The system of claim 1, wherein a control plane application programming interface (API) implements the updating and the storing in response to a modification to the file.

8. The system of claim 1, wherein the operations further comprise:
storing a timestamp associated with when the current metadata is captured with the version of the metadata for the file in the metadata database;
associating the timestamp with the new version of immutable content objects;
copying, based on the timestamp, the current metadata to the blob store as a metadata snapshot; and
restoring the previous version of the file associated with the restore time using a corresponding metadata snapshot.

9. The system of claim 1, wherein the request is initiated by the tenant based on input that specifies the restore time.

10. The system of claim 1, wherein the restore time is before a time of an event that compromises the tenant device thereby corrupting the file or preventing access to the file.

11. A method for backing up and restoring files for a tenant of a service that contains a set of defined resources within a boundary such that backup exposure to the files is limited to an operator of the service that contains the set of defined resources and an owner of the files, the method comprising:
configuring, as part of the set of defined resources, a metadata database to store a version of metadata for a file accessible via the service;
configuring, as part of the set of defined resources, a binary large object (blob), to store immutable content objects that comprise different versions of content of the file accessible via the service;
capturing current metadata for a current version of the file accessible to the tenant via a tenant device;
capturing current content of the current version of the file accessible to the tenant via the tenant device;
updating, in the metadata database, the version of the metadata for the file based on the current metadata for the current version of the file;
storing, in the blob store, the current content of the current version of the file as a new version of immutable content objects, wherein the new version of immutable content objects is stored in addition to previous versions of immutable content objects stored for previous versions of the file;

receiving a request to restore the file, wherein the request includes a restore time; and responsive to receiving the request, retrieving, within the boundary, the version of the metadata for the file and a reference to a previous version of immutable content objects stored for a previous version of the file associated with the restore time.

12. The method of claim 11, wherein the metadata database is mutable such that the version of metadata for the file is capable of being updated with metadata modifications that occur over time.

13. The method of claim 11, wherein the blob store is immutable such that the previous versions of immutable content objects, stored for the previous versions of the file, cannot be updated and are retained for a retention period.

14. The method of claim 11, wherein a control plane application programming interface (API) implements the updating and the storing in accordance with a predefined schedule.

15. The method of claim 14, wherein the predefined schedule is established for a group of files within a container.

16. The method of claim 11, wherein a control plane application programming interface (API) implements the updating and the storing in response to a modification to the file.

17. The method of claim 11, further comprising:

storing a timestamp associated with when the current metadata is captured with the version of the metadata for the file in the metadata database;

associating the timestamp with the new version of immutable content objects;

copying, based on the timestamp, the current metadata to the blob store as a metadata snapshot; and restoring the previous version of the file associated with the restore time using a corresponding metadata snapshot.

18. The method of claim 11, wherein the request is initiated by the tenant based on input that specifies the restore time.

19. The method of claim 11, wherein the restore time is before a time of an event that compromises the tenant device thereby corrupting the file or preventing access to the file.

20. Computer-readable storage media storing instructions that, when executed by a processing system, cause a system configured to back up and restore files for a tenant of a service that contains a set of defined resources within a boundary such that backup exposure to the files is limited to an operator of the service that contains the set of defined resources and an owner of the files, to perform operations comprising:

configuring, as part of the set of defined resources, a metadata database to store a version of metadata for a file accessible via the service;

configuring, as part of the set of defined resources, a binary large object (blob) store, to store immutable content objects that comprise different versions of content of the file accessible via the service;

capturing current metadata for a current version of the file accessible to the tenant via a tenant device;

capturing current content of the current version of the file accessible to the tenant via the tenant device;

updating, in the metadata database, the version of the metadata for the file based on the current metadata for the current version of the file;

storing, in the blob store, the current content of the current version of the file as a new version of immutable content objects, wherein the new version of immutable content objects is stored in addition to previous versions of immutable content objects stored for previous versions of the file;

receiving a request to restore the file, wherein the request includes a restore time; and responsive to receiving the request, retrieving, within the boundary, the version of the metadata for the file and a reference to a previous version of immutable content objects stored for a previous version of the file associated with the restore time.

* * * * *